United States Patent
Bucalo

[11] 3,913,679
[45] Oct. 21, 1975

[54] HORSESHOE CAPABLE OF ADAPTING TO HOOF GROWTH AND IMPACT

[75] Inventor: Louis Bucalo, Holbrook, N.Y.

[73] Assignee: Shods Incorporated, Holbrook, N.Y.

[22] Filed: Oct. 11, 1973

[21] Appl. No.: 405,439

Related U.S. Application Data

[63] Continuation-in-part of Ser. No. 329,861, Feb. 5, 1973, Pat. No. 3,841,408.

[52] U.S. Cl. .................................. 168/8; 168/24
[51] Int. Cl.[2] ........................................ A01L 1/04
[58] Field of Search ........ 168/4, 7, 8, 9, 24, DIG. 1; 63/11

[56] References Cited
UNITED STATES PATENTS

| | | | |
|---|---|---|---|
| 279,518 | 6/1883 | Atwood et al. | 63/11 |
| 1,694,703 | 12/1928 | Doppenschmitt | 63/11 |
| 3,805,548 | 4/1974 | Matwijcow | 63/11 |

FOREIGN PATENTS OR APPLICATIONS

| | | | |
|---|---|---|---|
| 360,076 | 6/1938 | Italy | 63/11 |

Primary Examiner—Robert Peshock
Assistant Examiner—Jack Q. Lever, Jr.
Attorney, Agent, or Firm—Steinberg and Blake

[57] ABSTRACT

A horseshoe which is capable of automatically adapting itself to hoof growth and hoof impact. The horseshoe includes a series of tiles which are arranged in a row in substantially end-to-end relation and which form a substantially U-shaped assembly. The tiles are spaced slightly from each other so as to define between themselves gaps which separate the tiles from each other. An elongated filamentary element is connected to the tiles and extends across the gaps therebetween so as to connect the tiles to each other, and this filamentary element is flexible so that the tiles can freely adapt themselves to growth of the hoof. The tiles are normally located in a common plane but are free to move transversely of the latter plane in response to impact forces.

12 Claims, 7 Drawing Figures

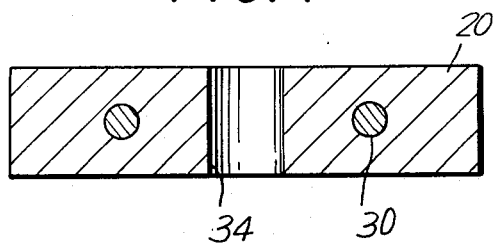
FIG. 4
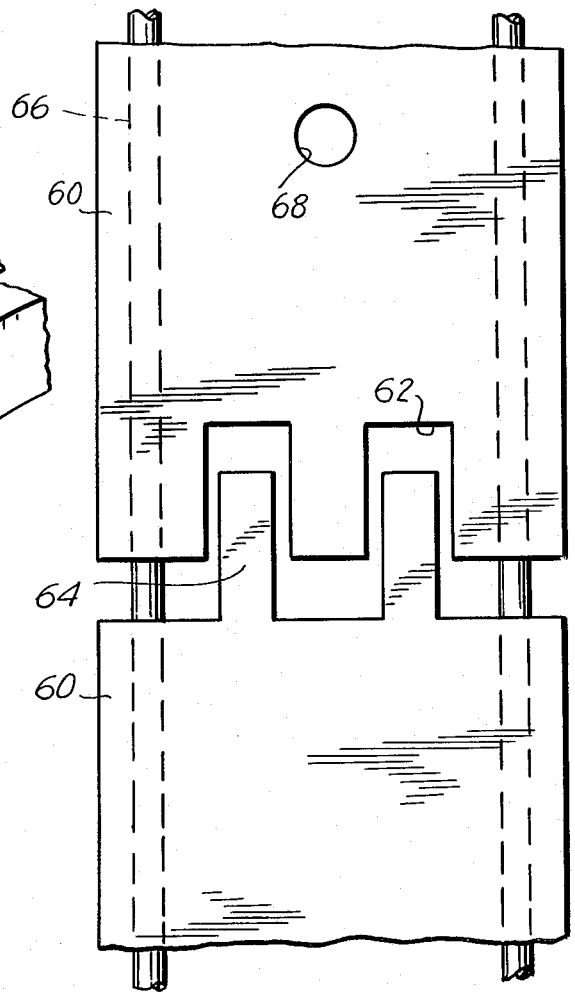
FIG. 5
FIG. 7
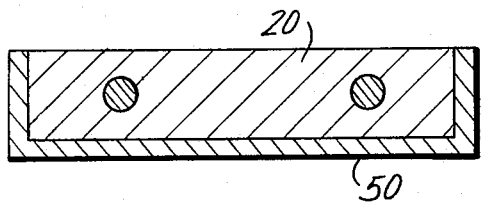
FIG. 6

HORSESHOE CAPABLE OF ADAPTING TO HOOF GROWTH AND IMPACT

CROSS REFERENCE TO RELATED APPLICATION

The present application is a continuation-in-part of copending application Ser. No. 329,861, filed Feb. 5, 1973 now U.S. Pat. No. 3,841,408 and entitled "HORSESHOES".

BACKGROUND OF THE INVENTION

The present invention relates to horseshoes.

As is well known horseshoes are conventionally in the form of substantially U-shaped elongated bodies of metal which are fastened to a hoof as by being nailed thereto.

Conventional horseshoes suffer from several drawbacks. Thus, conventional horseshoes are relatively rigid so that they do not adapt themselves to the growth of a hoof. As a result, it is necessary from time to time to change one horseshoe for another, and at the same time because conventional horseshoes do not adapt themselves to the growth of the hoof they create strains between the horseshoe and a growing hoof which result in loosening of the horseshoe and easily result in a sore hoof which requires treatment. Because conventional horseshoes are nailed to the hoof, it is difficult for the hoof to grow between the nails. Because the nails are maintained in a given position with respect to each other by conventional horseshoes it is not possible for conventional horseshoes to adapt themselves to the growth of the hoof.

Furthermore, it is necessary for the horseshoe to absorb impact forces. Thus, when a horse runs, for example, the hoof strikes against the ground, and the conventional horseshoes are situated between the hoof and the ground and are incapable of absorbing the impact forces in a desirable manner so that shocks are undesirably transmitted to the hoof which is prevented from yielding in the best possible manner in response to the impact forces.

SUMMARY OF THE INVENTION

It is accordingly a primary object of the present invention to provide a horseshoe construction which will avoid the above drawbacks.

In particular, it is an object of the present invention to provide a horseshoe which is capable of automatically adapting itself not only to growth of the hoof but also to impact forces.

Thus, it is a specific object of the present invention to provide a horseshoe with a construction which will enable nails which fasten the horseshoe to the hoof to move apart from each other in a manner which frees the hoof for growth without any restraint by the horseshoe itself.

In addition, it is an object of the present invention to provide a horseshoe which is capable of yielding at any part thereof in all directions, including a direction which is perpendicular to the surface of the hoof to which the horseshoe is fixed, so that it is possible for the horseshoe to adapt itself freely to impact forces while at the same time providing no undesirable restraint on the growth of the hoof.

Furthermore, it is an object of the present invention to provide a horseshoe construction which is relatively simple and rugged and which can readily be mounted on the hoof.

In accordance with the invention the horseshoe includes a series of tiles which are arranged in substantially end-to-end relation in a row and which forms a substantially U-shaped assembly. These tiles are spaced slightly from each other and define between themselves gaps which separate the tiles from each other. An elongated flexible means is connected to the tiles and extends across the gaps so as to connect the tiles to each other rendering each tile free to move in all directions with respect to adjoining tiles. The tiles are normally located in a common plane but are free to move transversely of this plane as a result of the connection of the tiles to each other by way of the flexible means.

BRIEF DESCRIPTION OF DRAWINGS

The invention is illustrated by way of example in the accompanying drawings which form part of this application and in which:

FIG. 4 is a transverse section of part of a horseshoe of FIG. 3 taken along line 4—4 of FIG. 3 in the direction of the arrows;

FIG. 5 is a fragmentary illustration of part of a different embodiment of a horseshoe according to the invention;

FIG. 6 is a cross sectional illustration of part of a horseshoe of the invention showing details in the structure thereof; and FIG. 7 fragmentarily illustrates a further embodiment.

DESCRIPTION OF PREFERRED EMBODIMENTS

Figure 1:
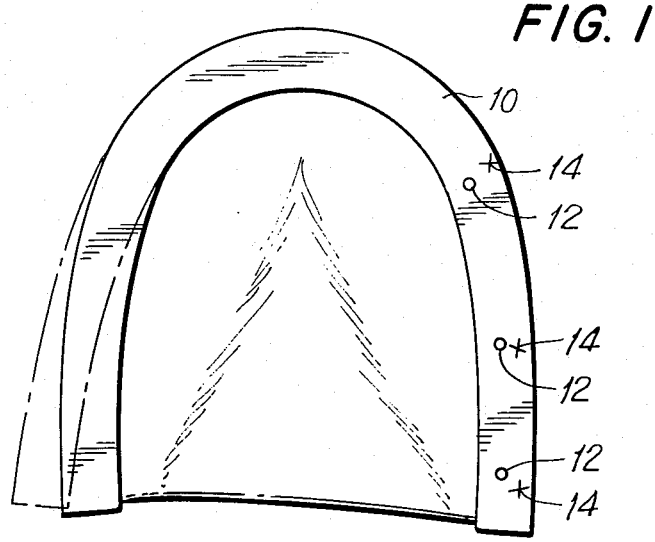
FIG. 1 is a bottom plan view of a hoof illustrating the manner in which a hoof behaves due to growth and due to impact forces.

Referring to FIG. 1, there is schematically shown therein the bottom surface of a normal hoof, in order to illustrate the problems which are solved by the present invention. The hoof has at its bottom surface the outer substantially U-shaped area 10 which receives the horseshoe. Assuming that nails are fixed to the hoof at points such as the points 12 in the area 10, then during growth of the hoof there will be a tendency for the points 12 to spread outwardly to the points 14. Of course while these points are shown at only one side of the area 10 it is to be understood that normally the nails are located at the points 12 spaced from each other all along the area 10. With a conventional horseshoe it is not possible for the nails to spread apart from each other and to progress outwardly to the points 14, because the nails are rigidly held at predetermined locations with respect to each other by the horseshoe, and therefore it is not possible for a conventional horseshoe to adapt itself to the growth of the hoof. It is this latter incapability of a conventional horseshoe to adapt itself to the growth of the hoof which creates serious problems with conventional horseshoes.

Furthermore, as is schematically shown at the left part of FIG. 1, during impact the hoof requires a freedom to flex outwardly and then inwardly, as shown by the dot-dash and solid line portions of the hoof at the left of FIG. 1. Of course the same action takes place at the right side of the hoof, as viewed in FIG. 1, the left side being used in FIG. 1 only to indicate in a schematic manner the action of the hoof during impact. The necessary freedom for flexure in response to impact forces also cannot be provided by conventional horseshoes, so that while a horseshoe is worn, completely aside from the incapability of adapting to growth, it is also incapable of providing the freedom required for flexure during impact, and this latter property of conventional horseshoes also presents problems.

Figure 2:
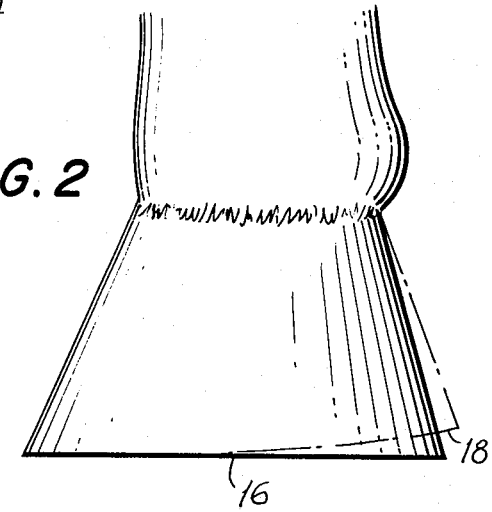
FIG. 2 is front view of a hoof illustrating the manner in which it responds to local impact forces.

It is important to appreciate that the flexure required during impact is not only a lateral flexure as shown. Thus, as may be seen from FIG. 2, the flexure must also take place perpendicularly with respect to the bottom surface of the hoof. As may be seen from FIG. 2, during local impact forces the bottom surface 16 of the hoof may be required to be displaced to the dot-dash line position 18 shown in FIG. 2. Thus it is necessary for the hoof not only to expand and contract laterally, but it is also necessary for the hoof to be capable of contracting and expanding perpendicularly to the bottom surface of the hoof in order to adapt itself to impact forces. Conventional horseshoes are incapable of adapting themselves to local impact forces to provide for the hoof a yieldability as illustrated in FIG. 2.

Figure 3:
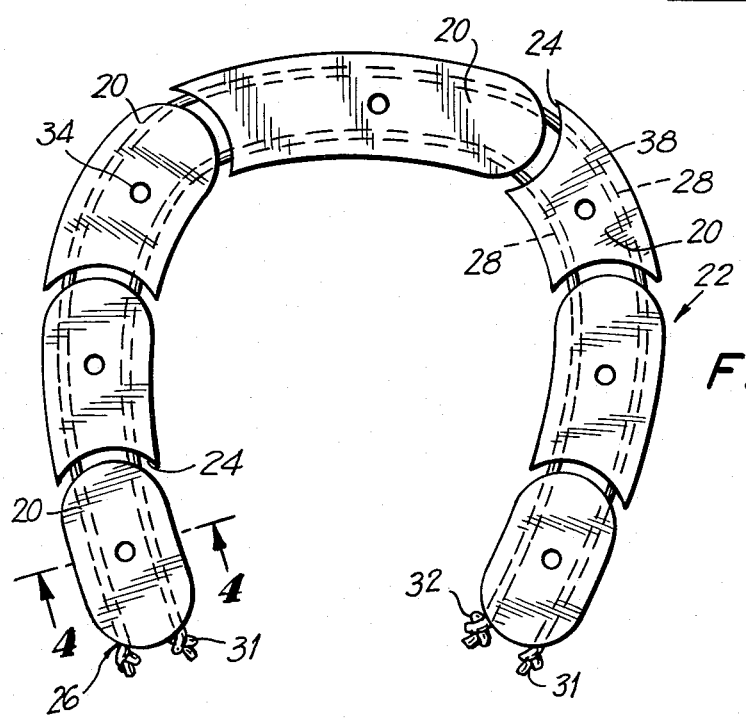
FIG. 3 shows in elevation one possible embodiment of a horseshoe according to the invention.

FIGS. 3 and 4 illustrate one possible embodiment of a horseshoe according to the present invention. Thus, referring to FIG. 3 it will be seen that the horseshoe of the invention includes a series of tiles 20 arranged in a row in substantially end-to-end relation so as to form the substantially U-shaped assembly 22. It will be seen that these tiles 20 are spaced slightly from each other so that the several tiles define between themselves the gaps 24 which separate the tiles from each other.

An elongated flexible means 26 is connected to the tiles and extends across the gaps therebetween so as to render each tile free to move in all directions with respect to the adjoining tiles. While the several tiles 20 are normally located in a common plane, as a result of the flexible means 26 it is possible for the tiles to move transversely of the common plane in which they are normally located.

In the illustrated example the flexible means 26 takes the form of a pair of elongated filamentary elements 28. These elongated filamentary elements 28 may take the form of a suitable wire or cable. Although two of the filamentary elements 28 are illustrated in FIG. 3 it is to be understood that only one filamentary element will suffice or more than two may be used as desired.

In order to connect the filamentary elements 28 to the tiles, the several tiles 20 are formed with elongated bores 30 passing longitudinally therethrough, and the filamentary elements 28 are threaded through these bores 30 and extend between the gaps. Although the frictional engagement of the filamentary elements 28 in the bores 30 is sufficient to reliably retain the several tiles connected to each other, the filamentary elements 28 may have elongated free end portions 31 extending through a relatively short distance beyond the opposed ends of the U-shaped assembly 22 and carrying suitable enlargements 32 so that there is no possibility of separation of the tiles from each other. These enlargements 32 may take the form of suitable beads situated on the wire or cable elements 28 and fastened thereto in any suitable way. In the event that the filamentary elements 28 are in the form of simple cords, they may be knotted to provide the enlargements 32. However, as pointed out above, such enlargements are not essential.

The several tiles are each provided with opposed ends which are curved as illustrated. Thus, between the pair of opposed end tiles 20 shown at the lower part of FIG. 3, there are a plurality of tiles each provided with opposed curved ends, and the curved ends which adjoin each other are of a matching curvature as illustrated, so that in this way the gaps 24 are curved as illustrated. It will be seen that the end tiles are each provided with a pair of opposed convex ends while except for one of the remaining tiles, all of the rest have one concave end and an opposed convex end. One of the tiles, the upper right tile 20 shown in FIG. 3, may have a pair of opposed concave ends to adjoin convex ends of the next preceding and the next following tile as illustrated.

Each of the tiles is formed with a substantially central opening 34. These openings extend through the tiles so that they are capable of receiving nails for fixing the tiles to the hoof.

It is clear, therefore, that with the structure of the invention each of the individual tiles is individually fixed to the hoof in such a way that each tile is free to move in all directions with respect to the adjoining tiles, and the different directions of movement are situated not only in the common plane in which all of the tiles are normally located but also these directions extend transversely with respect to this plane. Thus, with this construction it is possible for the several tiles to spread with respect to each other so that the nails can move, for example, from locations 12 to locations 14. Furthermore, because the tiles are free to move perpendicularly with respect to the plane in which they are all normally located, it is possible for the tiles to flex not only laterally, as shown in FIG. 1, but also perpendicularly with respect to the bottom surface of the hoof, as shown in FIG. 2. It is thus possible for the horseshoe construction of the invention to adapt itself automatically to growth of the hoof as well as to impact forces, thus avoiding the problems encountered with conventional horseshoes.

It is to be noted in particular that no part of any one tile overlaps any part of an adjoining tile as would be the case, for example, if the tiles had bevelled end surfaces located one above the other. Such a construction would inhibit the freedom of the tiles to move, particularly in a direction perpendicular to the bottom surface of the hoof to which the tiles are fixed.

With the construction of the invention it is possible for several lengths of tiles to be provided so that the tiles can be selected to form an assembly which will conform in the best possible manner to the particular hoof to which the horseshoe of the invention is to be connected. In addition it is possible to taper the tiles so that the thickness thereof is not uniform. Such tapered tiles can be utilized in order to correct a faulty step.

While in the above example the flexible means 26 is indicated as taking the form of flexible filamentary elements 28 which are accommodated in bores 30 which extend longitudinally through the tiles, it is also possible to provide an arrangement as shown in FIG. 5 according to which the tiles 40 are formed in one surface, such as the upper surface 42, with elongated grooves 44 which extend between the opposed ends of the tiles so that these grooves extend from one gap to the next. The filamentary elements 46 shown in FIG. 5 may be the same as the elements 28 shown in FIG. 2. They are longitudinally threaded into the grooves 44. It will be noted that these grooves are of a dovetail cross section having openings provided with a width smaller than the diameter of the filamentary elements 46 so that the latter will be reliably retained within the grooves. Of course the tiles 40 will conform in length and configuration to the tiles 20 and are fastened in the same way to the hoof.

Although it is possible to make the tiles of the horshoe of the invention of any desired relatively rigid materials, it is preferred to use for the tiles a material which is of low thermal conductivity, such as a suitable ceramic material. In this way it is possible to insulate a hoof against the heat at the surface which is engaged by the shoe.

Furthermore, according to a further feature of the invention, it is desirable to construct the tiles 20 or 40 of a relatively light metal so that the weight of the horseshoe is not undesirably great. Referring to FIG. 6, there is shown therein a tile 20 which is made of aluminum, for example. This relatively light metal may not have the desired hardness at its outer surface, to withstand the wear resulting from engagement with relatively hard surfaces such as highway surfaces or the like. Therefore, in accordance with the invention the relatively light metal used for the tiles 20 is hardened at its surface as by being provided in a well known manner with a coating 50 of tungsten carbide. In this way it is possible for the horseshoe of the invention to have a relatively light weight while at the same time being prevented from wearing away rapidly.

As is apparent from the drawings, the series of tiles of each embodiment forms a substantially U-shaped assembly which partly extends around a given central area corresponding to the central area at the bottom surface of a hoof. Moreover the tiles have substantially flat surfaces of a given length and width, as is apparent for the tiles shown in FIG. 3, for example, which are adapted to engage the bottom surface of the hoof and which are normally located in a predetermined plane. With respect to the length and width of these flat surfaces, each tile has a relatively small thickness, and each tile has opposed side edges of this latter thickness. One of these opposed side edges of each tile is an inner side edge which is directed toward the above central area partly surrounded by the U-shaped assembly, while the other of these side edges, the width of which corresponds to the thickness of the tile, is an outer side edge directed away from the central area which corresponds to the central area at the bottom surface of the hoof.

Furthermore, as is shown in FIG. 7, it is not essential for the several tiles to have curved ends as shown in FIG. 3. Thus, FIG. 7 shows in an enlarged fragmentary view, as compared with FIG. 3, a pair of adjoining tiles which may be interconnected by the same flexible means as is the case with FIG. 3, as described above. These tiles 60 have at their adjacent ends interdigitated teeth defining between adjoining tiles gaps of zig-zag configuration, as illustrated in FIG. 7. Thus FIG. 7 shows how the lower tile 60 has projecting teeth 64 received in the gaps between the teeth at the adjoining end of the upper tile 60 of FIG. 7, with the teeth of the upper tile of course being received also in the spaces between the teeth 64. Such a configuration also is in accordance with the invention. FIG. 7 shows the elongated filamentary elements 66 which correspond to the elongated filamentary elements 28 described above. Also the several tiles of FIG. 7 are formed with central openings 68 corresponding to the openings 34 for receiving nails. Thus, the construction of FIG. 7 also is in accordance with the invention. It is clear that the configuration of the ends of the tiles can vary in many different ways while achieving the results of the invention.

What is claimed is:

1. A horseshoe comprising a series of tiles arranged in a row in substantially end-to-end relation and forming a substantially U-shaped assembly partly extending around a given area corresponding to the central area at the bottom surface of a hoof, said tiles being spaced slightly from each other along said row and defining between themselves along said row a series of gaps which separate the tiles from each other along said row, and elongated flexible means connected to said tiles and extending across said gaps for connecting the tiles to each other, so that each tile is free to move in all directions with respect to an adjoining tile, said tiles respectively having substantially flat surfaces, each of a given length and width, normally located in a common plane and adapted to be situated next to the bottom surface of a hoof, each tile having a thickness which is a relatively small fraction of said length and width thereof, and each tile having inner and outer side edges, the width of which substantially equals said thickness, respectively directed toward and away from said given area.

2. The combination of claim 1 and wherein said elongated flexible means includes at least one elongated filamentary element, and said tiles respectively being formed with cutouts extending along each tile from one to the next of said gaps and receiving said filamentary element.

3. The combination of claim 2 and wherein said cutouts are in the form of bores respectively extending through said tiles and in which said filamentary element is located.

4. The combination of claim 2 and wherein said cutouts are in the form of grooves extending between said gaps and receiving said filamentary element.

5. The combination of claim 1 and wherein each tile is formed with a substantially central opening for receiving a nail for fixing each tile to a hoof independently of the other tiles.

6. The combination of claim 1 and wherein said tiles include a pair of end tiles and a plurality of tiles extending from one of said end tiles to the other of said end tiles, said plurality of tiles each having opposed ends of a given curvature substantially matching and extending along the adjoining ends of adjoining tiles to that said gaps are curved, said adjoining ends of adjoining tiles respectively including a concave end defining a given space and a convex end extending into said space.

7. The combination of claim 1 and wherein said flexible means includes a pair of elongated filamentary elements each extending along said tiles across the gaps therebetween and said tiles being formed with elongated cutouts in which said filamentary elements are located.

8. The combination of claim 1 and wherein said tiles are made of a material of low thermal conductivity for insulating a hoof from heat at the surface engaged by the tiles.

9. The combination of claim 1 and wherein said tiles are each composed of a relatively light metal at least partly covered with a coating which is substantially harder than said metal.

10. A horseshoe comprising comprising a series of tiles arranged in a row in substantially end-to-end relation and forming a substantially U-shaped assembly, said tiles being spaced slightly from each other and defining between themselves a series of gaps which separate the tiles from each other, and elongated flexible means connected to said tiles and extending across said gaps for connecting the tiles to each other, so that each tile is free to move in all directions with respect to an adjoining tile, said tiles normally being located in a common plane but being free to move transversely of said plane, said flexible means being in the form of an elongated filamentary element, and said tiles respectively being formed with elongated grooves extending between said gaps with each of said grooves being of a dovetail cross section and having an elongated opening at a surface of each tile which is of a smaller width than the interior width of each groove, said filamentary element having a diameter greater than the width of said opening of each groove and being received in the groove so as to be retained therein.

11. A horseshoe comprising a series of tiles arranged in a row in substantially end-to-end relation and forming a substantially U-shaped assembly, said tiles being spaced slightly from each other and defining between themselves a series of gaps which separate the tiles from each other, and elongated flexible means connected to said tiles and extending across said gaps for connecting the tiles to each other, so that each tile is free to move in all directions with respect to an adjoining tile, said tiles normally being located in a common plane but being free to move transversely of said plane, said tiles being composed of a relatively light metal at least partly covered with a coating which is substantially harder than said metal, said light metal being aluminum and said coating being tungsten carbide.

12. A horseshoe comprising a series of tiles arranged in a row in substantially end-to-end relation and forming a substantially U-shaped assembly, said tiles being spaced slightly from each other and defining between themselves a series of gaps which separate the tiles from each other, and elongated flexible means connected to said tiles and extending across said gaps for connecting the tiles to each other, so that each tile is free to move in all directions with respect to an adjoining tile, said tiles normally being located in a common plane but being free to move transversely of said plane, said tiles having at their adjacent ends interdigitated teeth defining gaps of zig-zag configuration.

* * * * *